United States Patent [19]

Caccamo

[11] 3,768,192
[45] Oct. 30, 1973

[54] MOUNTING MEANS FOR ANIMATING EXISTING DECOY

[76] Inventor: Samuel Caccamo, 1102 Camino Pablo, San Jose, Calif.

[22] Filed: Sept. 27, 1971

[21] Appl. No.: 183,809

Related U.S. Application Data

[63] Continuation-in-part of Ser. No. 125,595, March 18, 1971, Pat. No. 3,736,688.

[52] U.S. Cl. .......................................... 43/3, 46/124
[51] Int. Cl. ............................................. A01m 31/06
[58] Field of Search .......................... 43/2, 3; 46/124

[56] References Cited
UNITED STATES PATENTS

| | | | |
|---|---|---|---|
| 278,461 | 5/1883 | Screven | 43/2 X |
| 2,525,120 | 10/1950 | Ernst | 43/3 |
| 390,587 | 10/1888 | Gammon | 43/3 |
| 2,342,107 | 2/1944 | Agius | 43/3 |
| 2,331,421 | 10/1943 | Redhead | 43/3 UX |
| 2,709,866 | 6/1955 | Stumvoll et al. | 43/3 |
| 2,483,680 | 10/1949 | Timm et al. | 43/3 |

Primary Examiner—Louis G. Mancene
Assistant Examiner—James H. Czerwonky
Attorney—Leslie M. Hansen

[57] ABSTRACT

A means for animating an existing decoy on the end of a flexible arm for up and down movement therewith as well as pivotal movement into the direction of the wind and rockability from side to side about a horizontal axis upon an attaching means mounted on the end of the flexible arm. The animating means includes a plate with projecting ears mounted on the underside of the decoy. The attaching means includes a clevis mounted for movement about a substantially vertical axis. Hinge pin means pass through the ears and legs of the clevis to permit additional movement of the decoy about a substantially horizontal axis relative to the end of the flexible arm.

3 Claims, 13 Drawing Figures

PATENTED OCT 30 1973
3,768,192
SHEET 1 OF 2
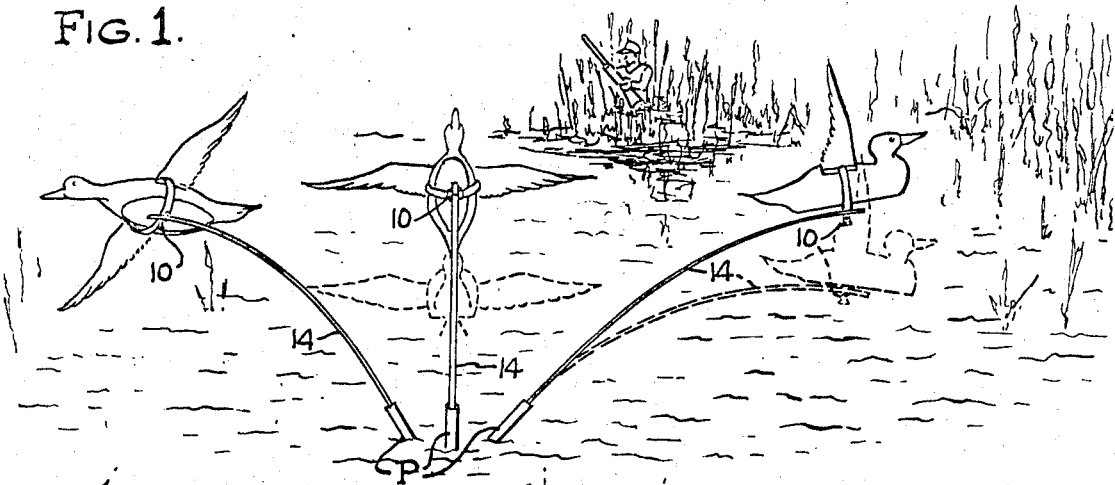
FIG. 1.
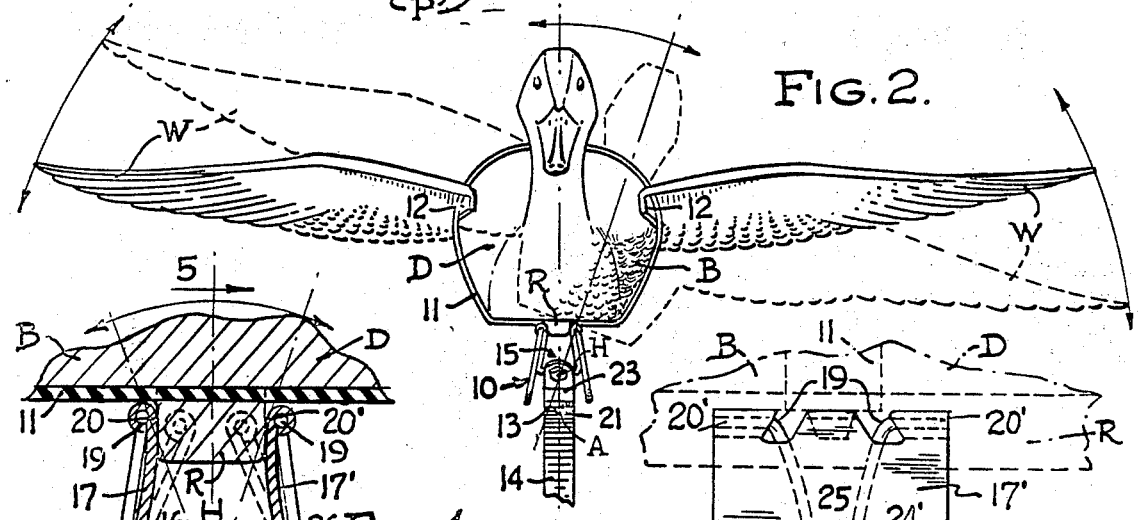
FIG. 2.
FIG. 4.
FIG. 5.
FIG. 3.
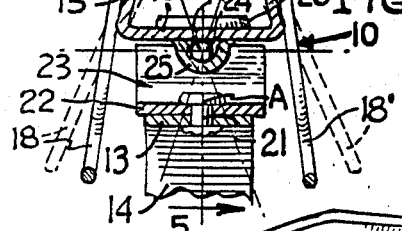
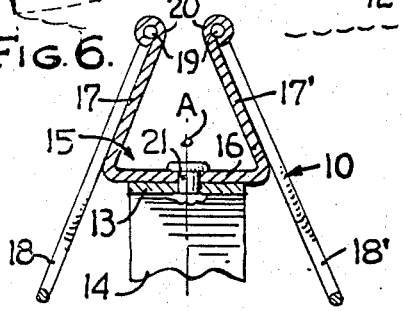
FIG. 6.
INVENTOR:
Samuel Caccamo
BY
Leslie M. Hansen
HIS ATTORNEY.

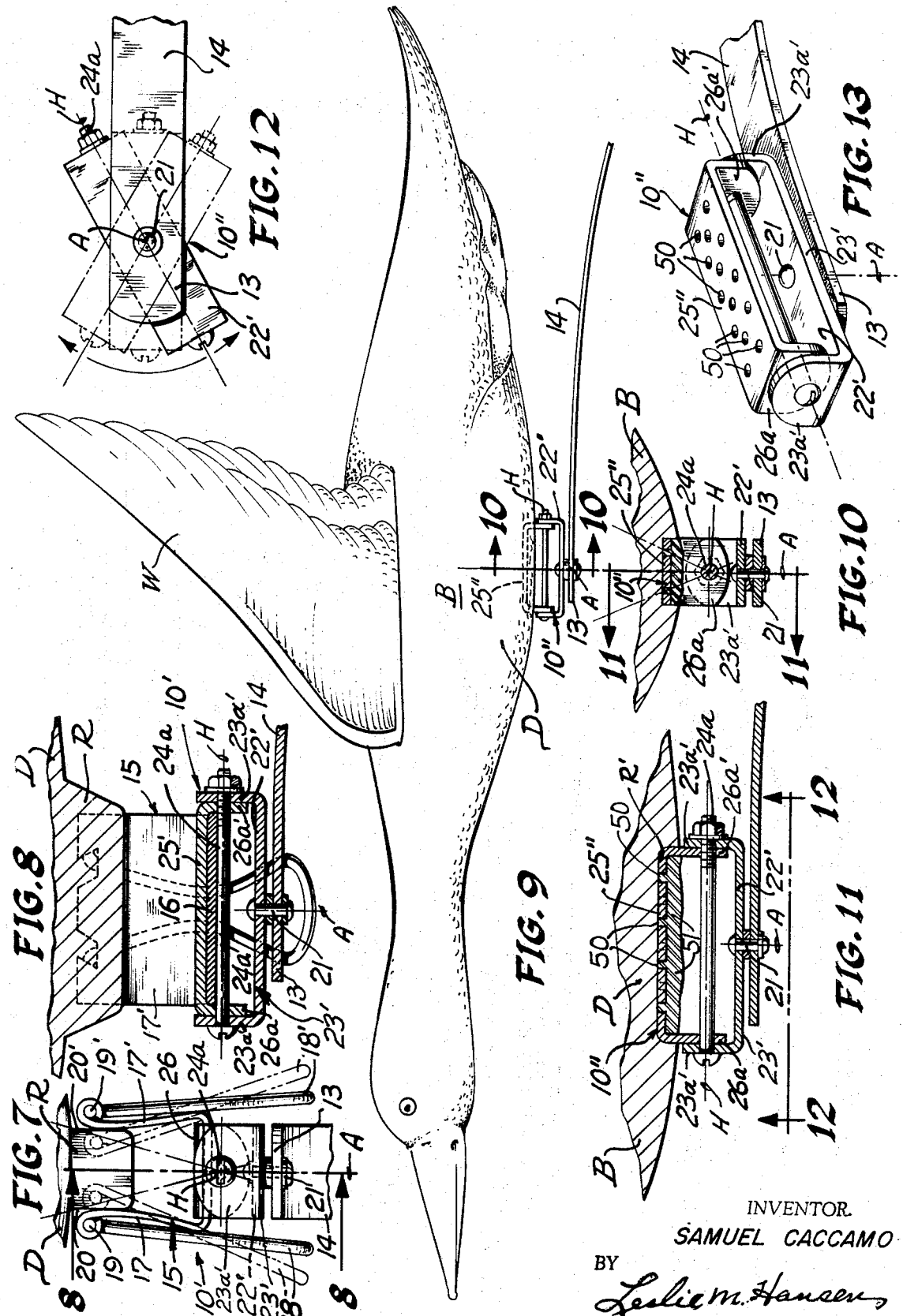

MOUNTING MEANS FOR ANIMATING EXISTING DECOY

CROSS-REFERENCES TO RELATED APPLICATIONS

This application is a Continuation in Part of my application Ser. No. 125,595, filed Mar. 18, 1971, now U. S. Pat. No. 3, 736, 688, issued June 5, 1973.

BACKGROUND OF THE INVENTION

This invention relates to waterfoul and the like, decoys and more particularly to means for mounting such decoys in a manner to achieve animation thereof during use.

Decoys as such are old and well known. The present invention is intended for use in combination with any type of decoys of ducks, geese and like fowl. The present invention is most suitable for use in combination with third dimensional decoys of either wooden, plastic or rubber third dimensional characteristics although single panel types may also be benefited by the mounting thereof on the animating supporting means of the present invention.

As examples of prior types of decoys, U.S. Pat. No. 2,535,445 of Dec. 26, 1950 to Miller et al. shows the single panel type; U.S. Pat. No. 2,747,316 dated May 29, 1956 granted to Benedetto shows the wooden or plastic, three dimensional type decoy. Benedetto and Miller also show wing attachments for their particular forms of decoy.

U.S. Pat. No. 2,441,753 to Carpenter on May 18, 1948 shows a single panel type decoy mounted like a weather vane on a vertical shank of a stake for turning with the wind about a verticle axis. This pivot shank theory is also shown in U.S. Pat. No. 2,711,608 which issued to Fulster June 28, 1955. In addition thereto Fulster provides a rubber grommet through the hollow shell back of the decoy to enable rockability of the decoy in any direction relative to horizontal.

In March of 1883 U.S. Pat. No. 278,461 issued to Sparkman R. Screven for a toy bird with movable wings, the bird being fixedly secured to one end of a spring arm having its opposite end anchorable to facilitate up and down movement of the bird during flexing of the spring arm.

The present invention has as its principal object the provision of a simple yet effective means for mounting a conventional and existing decoy in a manner to achieve animated action thereof in accordance with various wind conditions. This object contemplates decoys having fully spread wings and a means for mounting and pivotally connecting such decoy to one end of a flexible arm such as to achieve turnability of the decoy about a vertical axis.

It is another object to provide such means adapted to be secured to the decoy mounting for facilitating rockability of the decoy about a horizontal axis. This object further includes the provision of the dual action of turnability about a vertical axis as well as rockability about a horizontal axis relative to the flexible support arm and decoy.

The mounting means of the present invention is provided by an element attached to the base of a decoy and means for creating a hinge type connection between the latter and a flexible arm by which to achieve animation of an existing decoy.

In this connection it is a further object to provide a hinge connection for rockability of the decoy about an axis longitudinally of the decoy. Such rockability is combined with a portion of the mounting means having a vertical axial pivot connection with the extreme end of the flexible arm.

These and other objects and advantages of the present invention will become apparent in the following description in the light of the drawing in which:

FIG. 1 is a panoramic view of a duck blind having decoys mounted in accordance with the present invention;

FIG. 2 is a front elevation of a decoy at larger scale on a mount including the embodiments of the present invention;

FIG. 3 is a bottom plan of FIG. 2;

FIG. 4 is a fragmentary cross section through FIG. 3 taken along line 4—4 thereof and at larger scale;

FIG. 5 is a section through the decoy mount only of FIG. 4 taken along line 5—5 in FIG. 4; and FIG. 6 is a cross section through a simplified form of the embodiment of the mount including the principal embodiments of the present invention;

FIG. 7 is a modified form of the mounting shown in FIGS. 4 and 5;

FIG. 8 is a longitudinal section through FIG. 7 and taken along line 7—7 thereof;

FIGS. 9 through 13 show a more simplified and preferred embodiment of the present invention as permanently applied to a decoy and in which:

FIG. 9 is a side elevational view of a decoy in flight mounted in accordance with the present invention;

FIG. 10 is a cross section through a portion of FIG. 9 as seen along line 10—10 therein;

FIG. 11 is a longitudinal section through FIG. 10 taken along line 11—11 therein;

FIG. 12 is a bottom plan view looking up from line 12—12 in FIG. 11; and

FIG. 13 is a perspective view of the mount of FIGS. 9 through 12.

Referring to the drawing the mounting 10 forming the embodiment of the present invention is shown applied to a conventional decoy D available for duck hunters on the open market. Such decoy D may be of the solid wooden variety or of rubber and/or plastic so as to be floatable in a body of water. Such decoys D usually have a keel-like outwardly projecting portion R on its underside through which an anchor line may be strung or connected for tethering the decoy when it is afloat in a body of water. Such decoys D usually depict a sitting duck with wings drawn against the body B. For purposes of the present invention a pair of fully spread wings W are applied to the sides of the body B preferably by a strap or endless rubber band 11 strung through the keel rib R and a flange 12 on each wing W for quickly applying the wings W to the body B in spread condition as shown.

The decoy D with spread wings is secured to one end 13 of a long arm or strip of flexible material 14 by the mounting 10. The flexible arm 14 is adapted to have its opposite end anchored in earth or in a length of pipe P. The pipe P or end of the strap 14 is driven stake-like into the bottom of a pond adjacent a duck blind as illustrated in FIG. 1. The arrangement is such that the decoy will bob up and down at the end of the flexible arm 14 as the latter flexes due to wind action against the spread wings W attached to the decoy.

In accordance with the present invention the flexible arm 14 is preferably a length of spring steel strap iron in combination with the mounting means 10 of the present invention in a manner to achieve movability of the decoy relative to the free end of the flexible arm 14.

In the embodiment of FIGS. 1 through 8 the mounting means 10 comprises a U shaped spring clip 15 provided with a substantially flat bight portion 16 formed integrally with a pair of flexible arms 17—17'.

Each of the flexible arms 17—17' of the spring clip 15 is provided with a handle 18—18', respectively, hingedly connected as at 19 to the upper ends 20—20' of the respective arm 17 and 17'. These handles 18—18' are disposed to hang down parallel the respective arm 17—17' and to engage the juncture thereof with the bight portion 16 to effect a fulcrum action therewith. A person upon gripping of the two handles 18—18' between one's fingers, can flex the flexible arms 17 and 17' away from each other cross wise the spring clip 15 to enable the upper ends 20—20' to grippingly engage the keel-like outwardly projecting portion R on the lower surface of the decoy D.

The mounting means 10 is constructed for pivotal connection to the free end 13 of the flexible arm 14 for rotary movement about a vertical axis A. In its simple form (FIG. 6) this pivotal connection is shown as a rivet 21 or the like extending through the relatively flat bight portion 16 of the spring clip 15.

In a more sophisticated form (FIGS. 4 and 5) the vertical pivotal axis A is provided by the rivet 21 extending through the base 22 of a clevis 23 having its legs perforated to receive hinge pins 24—24', respectively. These hinge pins 24—24' extend into a hinge barrel formed in the upturned ends 26—26' of a plate 25. The ends 26—26' of the plate 25 extend beyond the hinge barrel and are crimped around the bight portion 16 of the spring clip 15. The hinge pins 24—24' are thus aligned and confined in the hinge barrel of plate 25 parallel to the long axis of the spring clip 15, i.e., transversely of the openable jaws 17—17' thereof. By this arrangement the spring clip 15 is rockable about a horizontal axis H to facilitate rockability of the decoy D relative to the base 22 of the clevis 23.

From the foregoing it will be appreciated that the mounting 10 facilitates rockability of the decoy D about the horizontal axis H as depicted in FIGS. 2 and 4 of the drawing. By the same token the mounting means 10 facilitates rotary swinging of the decoy D about the vertical axis A as depicted in FIG. 3 of the drawing. With the combined action afforded by the vertical and horizontal axis of the mounting means 10 the decoy D is enabled to achieve an animated action against and into the wind. This coupled with the up and down bobbing of the decoy at the end of the flexible arm 14 attains animation simulating the natural action of a bird over a pond adjacent a blind as illustrated in FIG. 1.

The spring clip 15 affords a quick and effective means of attaching an existing decoy to the mounting means 10. Moreover, the wings W being merely strapped to the existing decoy the entire assembly can be quickly and easily taken apart and the parts stored in the blind or carried to one's vehicle for transport to storage until further required.

The present invention also contemplates a more permanent mount 10' in which the clevis 23 is in the form of a U shaped member 23' having an elongated bight or base 22' pivotally mounted by the pin or rivet 21 to the extreme end 13 of the flexible arm 14.

In this form of the mount 10' the clevis 23' has its legs 23a and 23a' disposed to extend upwardly therefrom so as to lie in side by side relation to the ends 26a and 26a', respectively of the plate 25' for hinged connection by a long bolt 24a as shown in FIGS. 7 and 8.

The ear ends 26a and 26a' of plate 25' are disposed to embrace the bight 16 to provide for the hinge connection by being bored to receive a hinge pin 24a which bears against the bight 16 of clip 15 to thereby confine the bight 16 between the plate 25', its ears 26a-26a' and the hinge pin 24a. By this arrangement the mount 10' is removably attachable by the spring clip 15 to any rib or projection R on the underside of the decoy.

In the more simplified and preferred embodiment of the present invention (FIGS. 9 through 13) the arrangement is similar except that the plate 25" may be the aforementioned keel-like outwardly projecting portion R which is directly secured to the bottom or base of the decoy D. The hinge connection between the plate 25" and the clevis 23' is identical to that of FIGS. 7 and 8. The hinge pin 24a being of a bolt and nut form is removable so as to enable detachment of the decoy from the clevis 23' and flexible arm 14.

The plate 25" may be secured permanently to a decoy in any conventional manner to provide the outwardly projecting keel-like portion thereon. In the present and preferred embodiment the plate 25" is cemented into a recess R' formed in the bottom of the decoy. The plate 25" may be provided with perforations 50 for either screws or to provide anchorage for the adhesive or cement 51 within the recess R'.

While I have described my new mounting means for animating existing decoys in specific detail it will be appreciated that the same may be altered, varied and/or modified without departing from the spirit or scope of the invention therein as set forth in the following claims:

What I claim as new and desire to protect by Letters Patent is:

1. The combination with a decoy having a pair of wings attached thereto in spread wing condition to simulate flight and a flexible arm having one end anchorable in a pond or like body of water, of means for mounting said decoy for animated relation relative to said flexible arm comprising:
   a. a mounting end on said flexible arm opposite the anchorable end thereof;
   b. a clevis member having a base disposed above the mounting end of said flexible arm;
   c. means for pivotally connecting the base of said clevis member to the mounting end of said flexible arm for turning movement about an axis substantially vertical with respect thereto;
   d. a plate providing an outwardly projecting portion on the lower surface of the decoy and, said portion having a pair of ears at its fore and aft ends;
   e. means for attaching said plate to the bottom of such decoy in fore and aft alignment with said decoy;
   f. said clevis having a pair of legs disposed in side by side relation to the ears of said plate; and
   g. a hinge pin for hingedly connecting the legs of said clevis to the ears of said plate facilitating rockability of the latter and said decoy about a substantially horizontal axis relative to the mounting end of said flexible arm.

2. The mounting means in accordance with claim 1 including:
a. perforations formed in said plate; and
b. wherein said attaching means includes means extending through one or more of said perforations into contact with the bottom surface of said decoy for attaching said plate thereto.

3. The mounting means in accordance with that of claim 2 in which said hinge pin comprises a long bolt extending through the pair of ears of said plate and the pair of legs of said clevis.

* * * * *